United States Patent Office 3,849,581
Patented Nov. 19, 1974

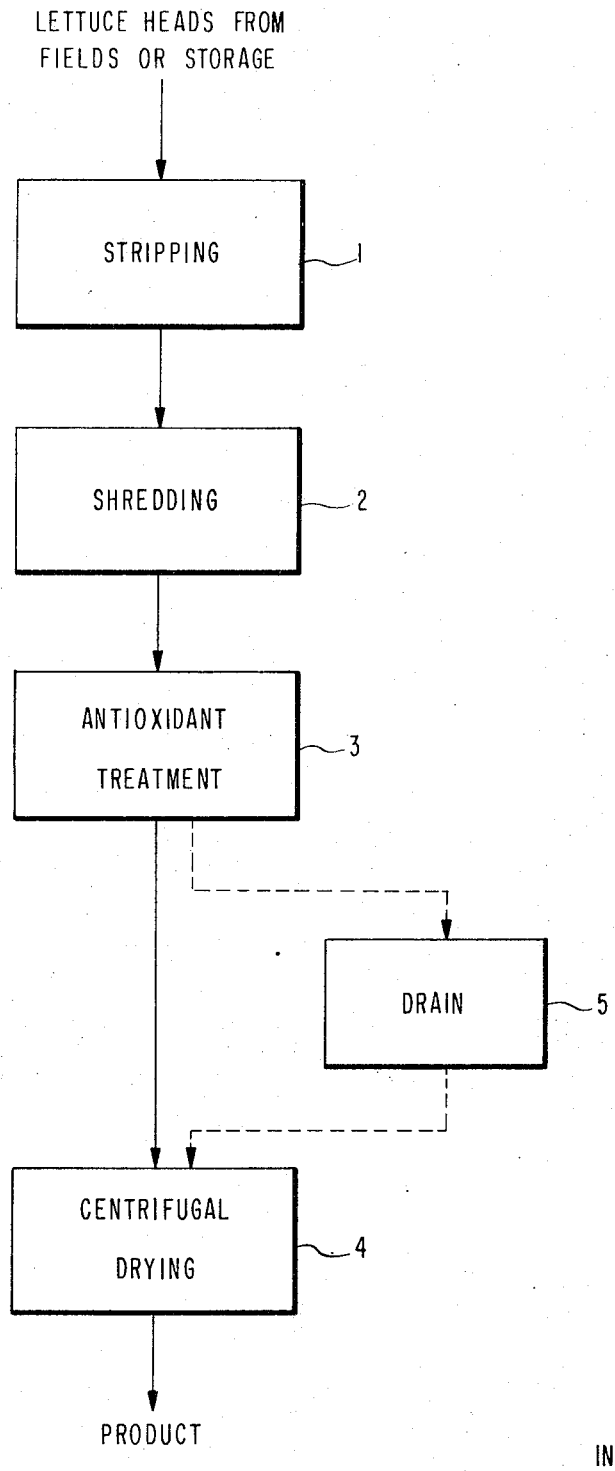

3,849,581
EXTENDED STORAGE LIFE LETTUCE PROCESS AND PRODUCT
Stanley Kubu, Miami, Fla., assignor to Burger King Corporation, Miami, Fla.
Filed Nov. 13, 1970, Ser. No. 89,404
Int. Cl. A23l *3/34*
U.S. Cl. 426—145          18 Claims

ABSTRACT OF THE DISCLOSURE

A method for treating shredded lettuce to prevent discoloration or wilting during extended shelf life of up to about three weeks is disclosed. Shredded lettuce is treated with an aqueous solution of an antioxidant, e.g. sodium bisulfite, and the excess antioxidant solution is drained from the shredded lettuce. The lettuce is then centrifugally dried to achieve a partial dehydration, from about 6 to about 10 weight percent of the original weight of the lettuce.

---

This invention relates to a new process for the treatment of shredded lettuce to provide a shredded lettuce product having an extended storage or shelf life without discoloration or wilting. In particular this invention concerns a process for treating lettuce whereby lettuce is shredded, treated with an antioxidant solution, and dried to achieve a partial dehydration of the lettuce whereby extended shelf life or storage life is obtained.

Shredded lettuce, such as iceberg lettuce, is often used as an ingredient in sandwiches, as a garnish for various types of meals and also is used in salads. In addition, shredded lettuce may be used as a bed upon which other food is arranged. At the present time, lettuce used for these purposes often is shredded in advance either at the point of use, e.g. a restaurant kitchen or the like, or at a central location. However, ordinary shredded lettuce must be used in a relatively short period of time. After two or three days of refrigerated storage in air-tight packaging the shredded lettuce generally is characterized by wilting as evidenced by a decrease in volume, and by the development of unsightly brownish color. Also, water from the shredded lettuce may collect in the bottom of the container in which the shredded lettuce is packed. Unrefrigerated shredded lettuce, of course, exhibits deterioration very quickly.

Attempts have been made to preserve lettuce so that it is usable for more than just a few days. As noted before, shedded lettuce stored under refrigerated conditions and in air-tight packaging will be usable for approximately two or three days. Shredded lettuce can be treated, for example, with a preservative in an antioxidant solution and drained to remove the treating solution. Such lettuce, however, has a shelf life (refrigerated and air tight packaged) of only up to about seven days.

It is an object of the present invention to provide a method for treating shredded lettuce such that it is usable for a period of up to about three weeks without exhibiting the normal discoloration and wilting normally associated with lettuce stored over an extended period.

It is another object of this invention to provide a method for providing shredded lettuce with extended shelf life which can be accomplished employing readily available equipment.

This invention contemplates a method of prolonging the shelf life of lettuce which comprises treating shredded lettuce with an aqueous antioxidant solution and drying centrifugally said treated shredded lettuce to achieve partial dehydration and a weight reduction of from about 6 to about 10 percent of the original weight of the lettuce.

In the process of this invention, the lettuce is treated with an aqueous antioxidant solution and excess aqueous antioxidant solution may be removed. Importantly, the shredded lettuce is dried, as by spin-drying or centrifuging, to achieve a partial dehydration of the lettuce, i.e., the water content is reduced to less than the content originally present in the lettuce. As is known, a substantial portion of the weight of lettuce is water. In the drying of this invention, from about six to about ten weight percent of the lettuce is dehydrated and the original weight of the lettuce is reduced. It has been found that shredded lettuce treated according to the method of this invention to achieve partial dehydration has a shelf life (air-tight packaged refrigerated) of up to about three weeks, thus offering the use of shredded lettuce of restaurant quality, e.g., without discoloration or wilting. Such lettuce has a much longer shelf life than lettuce from which only excess moisture has been removed.

Iceberg lettuce is normally used in sandwiches and this invention is particularly suited for the preservation of iceberg lettuce. Heads of lettuce are received from lettuce fields or from storage and initially undergo a stripping treatment. In the stripping treatment, the heads are cored to remove the hard central core of the lettuce, and the outer, mature leaves of the lettuce which may contain brown spots can be removed to obtain the cored, fresh head suitable for shredding. When the lettuce is stored prior to stripping, it is preferably stored at a temperature of about 32 to 40° F., preferably about 34 to about 36° F. The cored, stripped lettuce heads are then conveyed to a shredding operation in which the lettuce is shredded into slices, normally ranging from about 1/8 to about 3/4" wide. The shredder can be any of those well known in the art.

The shredded lettuce is then treated with an antioxidant. The antioxidant can be any of those known in the art. Sodium sulfite and sodium bisulfite, for example, in solution have been used to prevent discoloration of fruits and vegetables. It is also known, for example, to treat lettuce and other produce with aqueous solutions of the reaction products of an alkali metal carbonate, water and sulfur dioxide, the solution having a pH between 5.0 and 6.0. Triethanolamine, sulfurous acid, alkali metal thiosulfate solutions and thioamide substances and compounds, such as thiocarbamide, phenyl thiocarbamide, ortho-tolyl thiocarbamide, thioacetamide and thiosemicarbazide, have also been used. A preferred antioxidant solution containing sodium bisulfite buffered with an edible buffer to a pH of from about 5.2 to about 6.5. A suitable mixture for the antioxidant solution contains, for example, from about 70 to about 90 percent by weight sodium bisulfite, from about 5 to about 20 weight percent sodium carbonate and from about 2.5 to about 10 weight percent citric acid. Part of the citric acid can be replaced with ascorbic acid. Another suitable antioxidant mixture contains from about 65 to about 90, preferably from about 70 to about 85 weight percent sodium bisulfite with the balance being minor amounts of aluminum sulfate, calcium silicate, sodium acid pyrophosphate and tetrasodium pyrophosphate. The mixture can also contain a small amount of dextrose. The solution generally contains from about 0.1 to about 1 weight percent sodium bisulfite and preferably from about 0.2 to about 0.6 weight percent. The shredded lettuce is preferably dipped or submerged in the aqueous antioxidant solution for a time sufficient to permit intimate contact between the solution and all surfaces of the lettuce, e.g., from about 15 to about 45 seconds or longer. The treated shredded lettuce is then preferably allowed to drain, as by holding it over a drain tank for a time sufficient for the treating solution to thoroughly drain from the lettuce, e.g., from about 30 seconds to about 5 minutes or longer, preferably about 50 seconds to about 2 minutes. The drained solution can be recycled to the treating tank. While preliminary removal and recycle of antioxidant frequently will be economically desirable, the antioxidant can be removed in the centrifugal drying step described later. Even in such event the solution, with make-up if necessary, can be recycled.

The treating tank containing the antioxidant solution is preferably maintained at a temperature of about 32 to 40° F., most preferably 34 to 36° F., as by, for example, the use of suitable cooling means in the dip tank. The tank desirably also will contain a pump for continuously circulating the solution over the cooling means and the lettuce.

The drained lettuce is next conveyed to a centrifugal drying means. The drying means is preferably a spin dryer or centrifuge. In the drying operation, the lettuce is centrifugally dried for a time sufficient to achieve a partial dehydration of the lettuce. Such drying removes from about 6 to about 10 and preferably from about 6.5 to about 9.5 percent of the original weight of the lettuce. The drying operation will, of course, also remove any excess treating solution not removed by draining. The drier can be operated at a temperature of from about 32 to about 40° F., preferably about 34 to about 36° F. and a speed of above about 500 r.p.m., say 600 or 800 r.p.m. or greater, up to about 1000 r.p.m. or more, for a time sufficient to achieve the partial dehydration. Temperature of the lettuce during drying may rise a few degrees. When the lettuce temperature out of the drier is above about 40° F., e.g., up to about 45 or about 50° F., the lettuce is cooled immediately below about 40° F. In a typical commercially available centrifugal drier having a 30 inch diameter basket, operated at about 35° F. and about 800 to 900 r.p.m., a time of about 30 minutes achieves a partial dehydration between about 6 to 10 percent of the original weight of the lettuce. The spin dried, treated shredded lettuce can then be removed, packed and is ready for storage or for shipment for use directly to consumers. Packing in air tight packages, such as clear plastic bags, provides optimum storage life. Storage is maintained at about 32 to about 40° F., preferably from about 32 to about 36° F.

The invention will be further described with reference to the accompanying drawing in which the Figure represents a flow sheet outlining the process of the instant invention.

As shown in the Figure, heads of lettuce from the field or from storage are first treated in the stripping operation 1 in which the outer, mature and damaged leaves are removed and the heads are cored. The stripped, cored heads are then conveyed to the shredding operation 2 where they are shredded into slices of appropriate thickness, e.g., about ⅛ to about ¾" wide. The shredded lettuce is then treated with the antioxidant solution in the antioxidant treatment operation 3. The shredded lettuce can be conveniently submerged or dipped into the antioxidant solution for a time sufficient to permit intimate contacts between the lettuce and the solution.

The antioxidant treated shredded lettuce can be conveyed directly to the drying operation 4 which is a centrifugal or spin dryer. The lettuce is centrifugally dried for a time sufficient to achieve a partial dehydration of the lettuce of from about 6 to about 10 weight percent of the original weight of the lettuce. Alternatively, the antioxidant treated shredded lettuce can be drained of excess antioxidant solution in drain operation 5 indicated by dotted lines in the figure. The lettuce can, for example, be held over a drain tank for a time sufficient for the treating solution to drain thoroughly from the lettuce. The drained lettuce can then be conveyed to centrifugal drying operation 4.

The partially dehydrated lettuce removed from the drying operation 4 is the product and is ready for packaging in air-tight bags or drums and storage or for shipment to use directly to consumers.

The invention will be further described with reference to the following Examples.

EXAMPLE 1

Lettuce heads were stripped to remove all brown leaves and spots and the heads were cored. The cored, stripped heads were shredded in an Urschel cutter to provide shreds approximately ¼" wide. The shredded lettuce was packed into nylon mesh bags and dipped into an aqueous antioxidant solution of a commercially available antioxidant, maintained at temperatures between 34 and 36° F. The solution contained about 0.5 weight percent of a mixture of about 70 weight percent sodium bisulfite, balance essentially edible buffering agents and other additives. The antioxidant solution had a pH of about 5.8.

The shredded lettuce was dipped into the antioxidant solution for about 45 seconds with the bag being turned over several times to insure thorough penetration of the treating solution. The lettuce was removed and allowed to drain for about 15 seconds. The drained bags of lettuce were dried in a spin dryer (600 r.p.m.) for varying periods of time to achieve varying degrees of dehydration as shown below in Table I. The results of these runs are shown in Table I.

TABLE 1

| Run number | Head lettuce, age-days before processing | Spin dry time, min. | Weight percent dehydration |
|---|---|---|---|
| 701-1 | 4 | 30 | 8.8 |
| 701-2 | 4 | 30 | 4.3 |
| 701-3 | 4 | 30 | 6.1 |
| 701-4 | 4 | 30 | 6.1 |
| 701-5 | 4 | 30 | 6.3 |
| 701-6 | 4 | 30 | 6.1 |
| 701-7 [1] | 4 | 30 | 6.7 |
| 701-8 | 4 | 30 | 7.7 |
| 703-1 | 6 | 30 | 7.1 |
| 703-2 | 6 | 30 | 5.3 |
| 703-3 | 6 | 30 | 6.5 |
| 703-4 | 6 | 30 | 5.8 |
| 703-5 | 6 | 30 | 9.2 |
| 703-6 | 6 | 30 | 7.4 |

[1] Lettuce not treated with antioxidant solution before spin-drying.

The lettuce treated as above was stored in polyethylene bags over a period of days at a temperature of about 32 to 35° F. Observations were made of color, wilting and amount, if any, of water in the bags. These observations are reported below in Table II.

TABLE II

| Run number | Age after processing, days | Observations |
|---|---|---|
| 701-1 | 4 | No apparent change. |
|  | 9 | Do. |
|  | 13 | Slight evidence of wilting. |
| 701-2 | 6 | No apparent change. |
|  | 9 | Do. |
| 701-3, 4 | 6 | Do. |
|  | 9 | Do. |
|  | 10 | Slight compacting. |
| 701-5, 6 | 6 | No apparent change. |
|  | 9 | Do. |
|  | 10 | Slight compacting. |
|  | 14 | Slight wilting. |
| 701-7 [1], 8 [1] | 7 | Starting to brown. |
|  | 9 | Severe browning. |
|  | 10 | All pieces show browning. Discard |
| 703-1, 2, 3, 4, 5, 6 | 15 | No apparent change. |
|  | 18 | Slight browning and wilting. |
|  | 19 | Do. |
|  | 20 | Browning and wilting—Probable end of useful life. |

[1] Lettuce not treated with antioxidant solution before spin-drying.

EXAMPLE 2

Lettuce heads were treated in the same manner as in Example 1 except that the spin drying time and weight percent dehydration were varied. The results of these runs are shown in Table III.

TABLE III

| Run number | Head lettuce, age-days before processing | Spin dry time, min. | Weight percent dehydration |
|---|---|---|---|
| 627-1 | 5 | 20 | 7.5 |
| 627-3 | 5 | 25 | 3.7 |
| 627-4 | 5 | 25 | 5.3 |
| 627-5 | 5 | 25 | 4.7 |
| 627-6 | 5 | 25 | 5.0 |

The lettuce treated as above was observed in the same manner as the lettuce of Example 1. These observations are reported below in Table IV.

TABLE IV

| Run number | Age after processing, days | Observations |
|---|---|---|
| 627-1 | 6 | Slightly wet, starting to compact, color food' no browning. |
| | 10 | Free water in bottom of bag, glassy and transparent, wilted, no browning. |
| | 13 | Wilted to about ½ original volume, no browning. |
| | Discard | |
| 627-3 | 6 | No apparent change. |
| | 10 | Do. |
| | 13 | Slightly wet, starting to wilt, no browning. |
| 627-4 | 6 | No apparent change. |
| | 10 | Do. |
| | 13 | Slightly wet, starting to wilt, no browning. |
| 627-5 | 6 | No apparent change. |
| | 10 | Do. |
| | 13 | Slightly wet, starting to wilt, no browning. |
| | 14 | Free water in bag, wilted. |
| | Discard | |
| 627-6 | 6 | No apparent change. |
| | 10 | Do. |
| | 13 | Slightly wet, starting to wilt, no browning. |
| | 14 | Free water in bag, wilted. |
| | Discard | |

As may be seen from a consideration of the above data, lettuce which was treated with the antioxidant solution and then spin-dried for a period of 20 minutes showed signs of deterioration in 6 days and was of usable quality for 10 days. Lettuce in the same run which had been spin-dried for 25 minutes (3.7 to 5.3% dehydration, runs 627-3, 4, 5, 6) started to show deterioration after 13 days and was unusable after 14 days. The lettuce of Example 1 which had been treated with the antioxidant solution and then spin-dried for a period of 30 minutes (generally above about 6 weight percent dehydration and often above about 6.5 weight percent dehydration) remained in usable condition for at least 13 and often up to 21 days. The lettuce which was not treated with the antioxidant solution but which was spin-dried for 30 minutes (6.7 to 7.7% dehydration) showed signs of browning in 6 days and was completely brown in 10 days, although there was little or no wilting. It is also noted that there are some inconsistencies in the data. The reason for these inconsistencies is not known but it is known that there are variations in lettuce, such as shelf life (untreated) for no apparent reasons. These natural variations occur also in other produce.

I claim:

1. A method of prolonging the shelf life of lettuce which comprises:
   (a) shredding lettuce;
   (b) treating the shredded lettuce with an aqueous antioxidant solution; and
   (c) centrifugally drying said shredded lettuce to achieve partial dehydration of from about 6 to 10 percent of the original weight of the lettuce.

2. The method of claim 1 wherein the aqueous antioxidant solution is an aqueous solution containing sodium bisulfite having a pH of above about 5.2.

3. The method of claim 2 wherein the aqueous antioxidant solution contains a mixture of from about 65 to about 90 weight percent sodium bisulfite, balance being essentially minor amounts of aluminum sulfate, calcium silicate, sodium acid phosphate and tetrasodium pyrophosphate.

4. The method of claim 2 wherein the antioxidant solution contains from about 0.1 to 1 percent sodium bisulfite.

5. The method of claim 1 wherein the treated shredded lettuce is centrifugally dried to remove about 6.5 to 9.5 weight percent of the water originally contained in the shredded lettuce.

6. The method of claim 1 wherein the lettuce is iceberg lettuce.

7. The method of claim 1 wherein the antioxidant treated shredded lettuce is drained of excess antioxidant prior to centrifugal drying.

8. The method of claim 1 wherein the shredded lettuce is treated with the aqueous antioxidant solution at a temperature of about 32 to about 40° F.

9. The method of claim 8 wherein the shredded lettuce is treated with the aqueous antioxidant solution at a temperature of about 34 to about 36° F.

10. The method of claim 1 wherein the lettuce is centrifugally dried at a temperature of from about 32 to about 40° F.

11. The method of claim 1 wherein the treated and partially dehydrated lettuce is stored at a temperature of from about 32° F. to about 40° F.

12. The method of claim 11 wherein the treated and partially dehydrated lettuce is stored at a temperature of from about 32° F. to about 40° F. under air tight conditions.

13. A method of treating lettuce to produce a shredded lettuce product having extended storage life without substantial discoloration or wilting which comprises:
   (a) removing the core and outer leaves from a head of lettuce to clean the lettuce;
   (b) slicing the cleaned head of lettuce to produce shredded lettuce;
   (c) treating the shredded lettuce at a temperature of about 32 to 40° F. with an aqueous antioxidant solution of sodium bisulfite containing about 0.1 to about 1 weight percent of a mixture containing from about 70 to about 85 weight percent sodium bisulfite, balance essentially being minor amounts of aluminum sulfate, calcium silicate, sodium acid phosphate and tetrasodium pyrophosphate, said solution having a pH above about 5.2;
   (d) draining excess antioxidant solution from the shredded lettuce; and
   (e) centrifugally drying the drained shredded lettuce at a temperature of from about 32 to 40° F. to partially dehydrate the shredded lettuce whereby from about 6 to 10 weight percent of the water originally contained in the lettuce is removed.

14. The method of claim 13 wherein said centrifugal drying removes about 6.5 to 9.5 percent of the water originally present in the lettuce.

15. The method of claim 13 wherein said shredded lettuce is treated with the aqueous antioxidant solution in step (c) by submerging the lettuce in the antioxidant solution for about 15 to 45 seconds.

16. A storage stable lettuce of prolonged shelf life at temperatures of about 32° F. to about 40° F. comprising shredded lettuce having an antioxidant treatment on the surface thereof, said lettuce being partially dehydrated by centrifuging, the amount of partial dehydration being from about 6 to about 10 percent of the original weight of the lettuce.

17. The storage stable lettuce of claim 16 wherein the shredded lettuce is iceberg lettuce.

18. The storage stable lettuce of claim 17 wherein the antioxidant is a solution of sodium bisulfite containing about 0.1 to about 1 weight percent of a mixture containing from about 70 to about 85 weight percent sodium bisulfite, the balance essentially being minor amounts of aluminum sulfate, calcium silicate, sodium acid phosphate and tetrasodium pyrophosphate, said solution having a pH above about 5.2.

References Cited
UNITED STATES PATENTS

| | | | |
|---|---|---|---|
| 2,108,563 | 2/1938 | Mnookin | 99—103 |
| 2,212,432 | 8/1940 | Brandt | 99—103 |
| 2,380,259 | 7/1945 | Pierce | 99—103 |
| 2,474,650 | 6/1949 | Birdseye | 99—204 |
| 2,583,686 | 1/1959 | De Ment | 99—156 |
| 2,709,657 | 5/1955 | Campbell | 99—204 |
| 1,747,002 | 2/1930 | Hamilton | 99—103 |
| 1,885,100 | 10/1932 | Robinson | 99—103 |
| 2,336,291 | 12/1943 | Phillips | 99—154 |
| 2,470,424 | 5/1949 | Alvos | 99—154 |
| 2,666,711 | 1/1954 | Crosset | 99—204 |
| 2,628,905 | 2/1953 | Antle | 99—154 |
| 3,305,366 | 2/1967 | Sutton | 99—154 |
| 3,497,362 | 2/1970 | Patron | 99—154 |

NORMAN YUDKOFF, Primary Examiner

M. G. MULLEN, Assistant Examiner

U.S. Cl. X.R.

426—178, 324, 328, 443, 464